March 26, 1946.  E. H. LAND  2,397,275
RANGE FINDER
Filed March 10, 1944  2 Sheets-Sheet 1

INVENTOR.
Edwin H. Land
Donald L. Brown
BY
Attorney

March 26, 1946. E. H. LAND 2,397,275
RANGE FINDER
Filed March 10, 1944 2 Sheets-Sheet 2
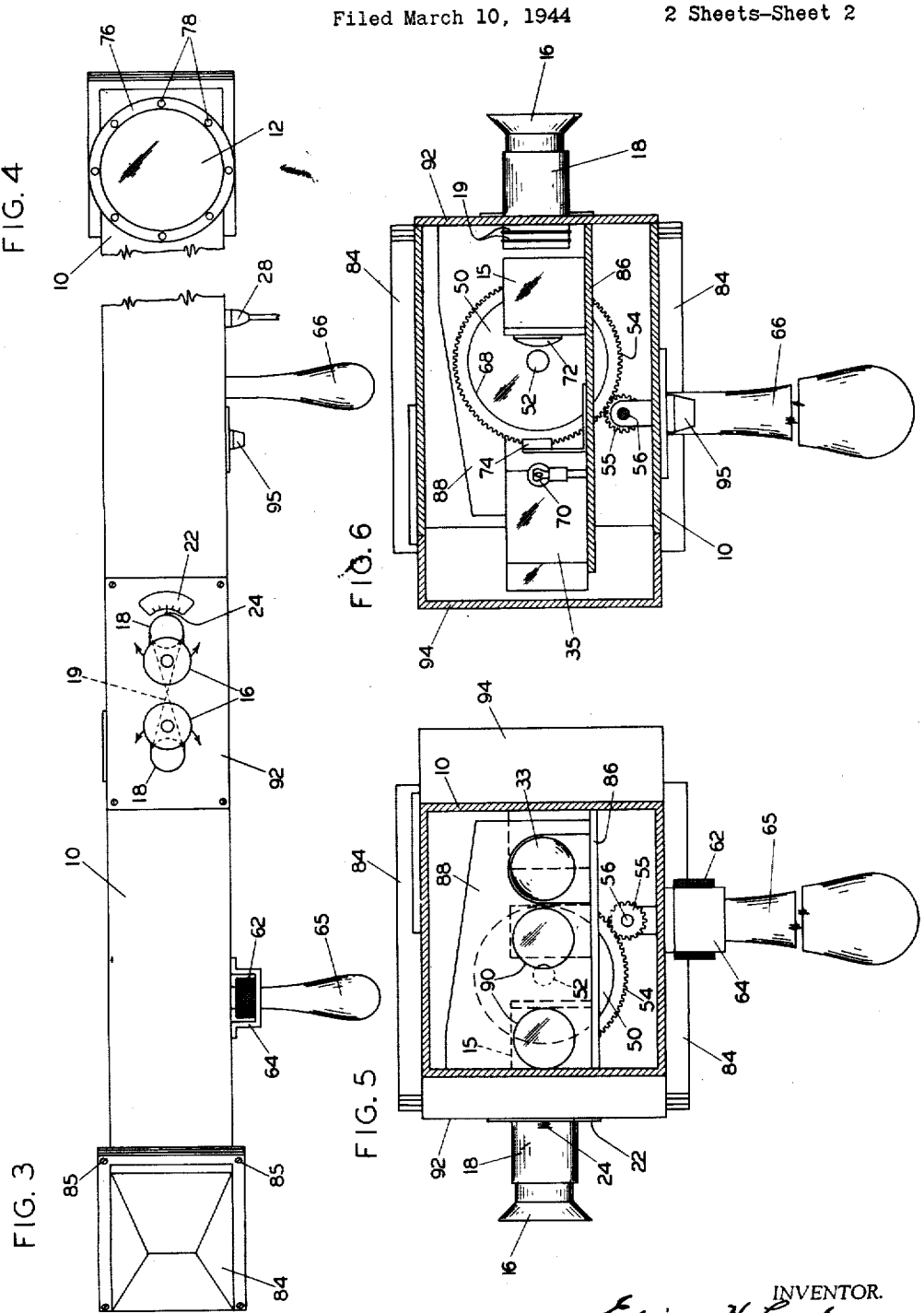
INVENTOR.
Edwin H. Land
Donald L. Brown
BY Attorney Patented Mar. 26, 1946

2,397,275

UNITED STATES PATENT OFFICE 2,397,275

RANGE FINDER

Edwin H. Land, Cambridge, Mass., assignor to Polaroid Corporation, Cambridge, Mass., a corporation of Delaware Application March 10, 1944, Serial No. 525,928

13 Claims. (Cl. 88—2.7)

This invention relates to optical instruments and more especially has reference to range finders.

An important object of the invention is to provide a new and improved range finder of the stereoscopic type and especially a range finder having novel means for impressing optical indicia on the field of view, together with means for bringing the indicia into apparent residence within the plane of the object as it appears in the field whereby to permit computation of the distance of the object from the observer.

Equally important objects include the provision in a range finder of the foregoing character of an improved arrangement and design of optical elements for increasing the interocular for viewing the field; the employment of novel means for collimating light used in superimposing optical indicia in the field of view; the provision of optics possessing a self-aligning feature designed to avoid, within limits, the necessity of their readjustment because of their displacement occurring during use of the instrument; and, also the provision of means for correcting or compensating for reasonable degrees of error in the optics themselves and in their positioning in the range finder during assembly.

Other objects of the invention reside in providing, in a stereoscopic range finder, indicia in the form of two images, each visible to a different eye of an observer and means for causing simultaneous apparent motion of the images towards and away from the observer, together with means for translating the relative position of the images into a measurement of the distance from the instrument to the apparent spatial position of the images.

Further objects of the invention are to provide a range finder having only a small number of moving parts, using simple optical elements having few working surfaces to the avoidance of complex lens structures, and being capable of use at unit magnification without the use of lenses and the necessity of a separate finder, all to the end of providing a portable instrument of simple design, light weight, and sturdy construction which lends itself to ease of manufacture.

Many other objects and advantages will in part be apparent and in part be pointed out in the course of the following description of one or more embodiments of the invention, which are given as non-limiting examples, in connection with the accompanying drawings, in which:

Fig. 3 is a partial rear view of the range finder shown in Fig. 1;

Fig. 4 is a partial front view of the range finder shown in Fig. 1;

Fig. 5 is an enlarged section on the line 5—5 in Fig. 1; and

Fig. 6 is an enlarged section on the line 6—6 in Fig. 1.

Figure 1:
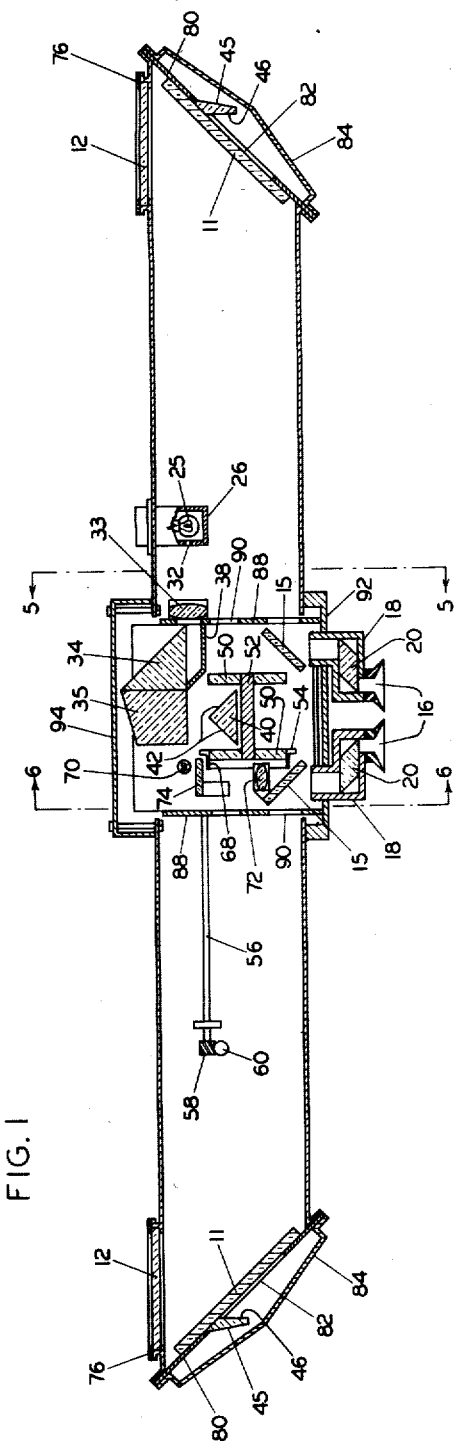
Figure 1 is a horizontal sectional view through a range finder embodying the invention.

In the form of the invention shown in the drawings, housing 10 of any desired size or design is provided with spaced reflecting means in the form of a pair of mirrors 11 adapted to receive light from in front of the instrument through windows 12 as indicated by ray lines 14 and to reflect said light towards other spaced reflecting means, such as mirrors 15, and then to eyepieces 16. This arrangement serves both to provide an effectively enlarged interocular distance or increased stereoscopic effect in viewing an object in the field, and also to limit the field of view to an area substantially in front of the instrument. Mirrors 11 and 15 are preferably transparent for reasons explained hereinafter, and windows 12 are preferably round, as shown in Fig. 4, and slightly wedge-shaped, also for reasons to be explained hereinafter. Eyepieces 16 are preferably formed, as indicated, of rubber or other suitable resilient material.

An observer employing the range finder shown in the drawings will look simultaneously through both of eyepieces 16, with the result that his right eye will receive light from right-hand mirrors 11 and 15 and his left eye will simultaneously receive light from left-hand mirrors 11 and 15. It is to be understood that said mirrors should be so positioned as to enable an observer employing the instrument to see substantially the same field with each eye. The effect and purpose of this arrangement is to increase the effective interocular distance of the observer by the distance between mirrors 11, and thus to increase considerably the stereoscopic acuity of his vision as applied to the field.

As is shown particularly in Figs. 1 and 3, eyepieces 16 preferably include conventional means permitting adjustment for different human interoculars. Said means comprise a tube 18, generally of crank-like construction, rotatably mounted in housing 10 as indicated by the arrows in Fig. 3, and including a rhomb 20 of glass or some suitable transparent material. Simultaneous adjusting movement of the eyepieces 16 may be effected in known manner, for example by belt means 19, shown in the drawings as engaging the tubes 18. There may also be provided on the outside of the instrument, as shown in Fig. 3, a scale 22 cooperating with a suitable pointer or marker 24 on one of tubes 18 for indicating the distance between eyepieces 16 in any given position.

Figure 2:
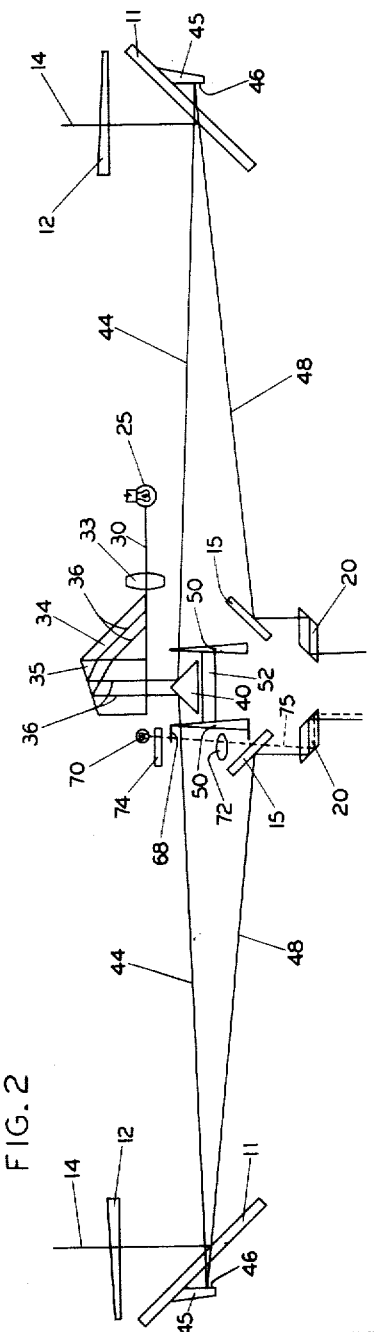
Fig. 2 is a diagrammatic view illustrating in plan the operation of the optical elements employed in the range finder shown in Fig. 1.

An indicia-forming means or reticle system used with the invention is illustrated in Figs. 1 and 2. This system, which is auxiliary to that used to image the object undergoing observation, comprises a light source, a reticle, a prism system having collimating and achromatizing means and means for superimposing left-eye and right-eye images of the reticle in the field of view.

The light source may be provided by an electric lamp 25, energized by any suitable source of current, as indicated by plug and wire 28 in Fig. 3, and mounted within a housing or shield 26. A reticle is provided by a vertical slit 32 formed in the housing 26 and through which light from the source 25 is emitted in a beam 30.

Partial collimation of the beam 30 is effected by a lens 33 arranged in the path thereof to direct the beam onto the entrance face of a prism 34 at a near grazing angle of incidence to such face. Further collimation of the rays of beam 30 which enter prism 34 is carried out by that prism with the assistance of an exit face which is preferably perpendicular to the emergent rays. The rays 36 of beam 30 which enter prism 34 are collimated in the plane of incidence thereof and, as shown in Fig. 2, are redirected to pass through the exit face of the prism.

It is desirable to achromatize the rays 36 and for this purpose use is made of a prism 35 which, in the form shown, also possesses the ability to redirect them in the manner illustrated in Fig. 2. In this arrangement the entrance face of prism 35 may be in contact with the exit face of prism 34 as shown, or it may be separated therefrom and in suitable alignment therewith. Preferably, prism 35 is designed so that the collimated rays passing therethrough emerge in a direction which is substantially perpendicular to the exit face of the prism. As may be noted, the entering light is internally reflected within prism 35. If desired, the outer surface of the reflecting face of prism 35 may be provided with a suitable metallic coating to enhance the reflecting effect.

I have found that light from either a point or a line source may be collimated in a manner heretofore generally unattainable if it is directed onto the entrance face of a suitably designed prism at a near grazing angle of incidence and after refraction by the prism emerges from the exit face thereof in a direction which is preferably substantially normal to the exit face. Under these circumstances not only will the rays incident on the entrance face at substantially the grazing angle be collimated in the usual sense but the apparent angular separation will be decreased between rays coming from different points in the plane of collimation. Another way of saying this is that there will also be a reduction of the apparent angular width of the source being collimated. Of course if the rays entering the prism at grazing incidence are partially collimated in the usual sense, this collimation will be improved during their passage through the prism. The shape of the collimating prism and its size are immaterial and collimation of the character desired has been obtained even where the emergent rays in the plane of collimation make an angle of around 15° with the normal to the exit face of the prism.

If the prism 35 is omitted, it will of course be merely a matter of design to construct the prism 34 so that it will redirect light in the desired direction at substantially a right angle to the exit face of such prism.

Enhanced collimation of the light directed onto the entrance face of prism 34 will be attained if this light is first partially collimated. For this reason, the lens 33 is employed although it is to be understood that the lens is not an essential to the operation of the system herein described.

Stray light from source 25 which fails to enter the desired prism surface may be eliminated by means of any suitable baffle means 38 and, if desired, by providing the hypotenusal surface of prism 34 with a suitable light-absorbing coating.

By way of explaining the collimation obtained by the prism means, it is to be recalled that the angle of incidence of beam 30 on the entrance face of the prism 34 approaches the grazing angle, or 90°. The prism 34 is formed of a material having such an index of refraction that the refraction of the rays 36 is of the order of 41°. At these angles, relatively large variations in the angles of incidence of rays making up the beam 30 will produce very small variations in their angles of refraction within the prism 34. Because of this, the refracted rays within the prism 34 will be more truly collimated than the rays incident on the entrance surface of this prism.

As one specific example illustrating the efficiency of the above-described collimating system, let it be assumed that prism 34 is made of crown glass having an index of refraction of 1.5233 and having the active surfaces thereof flat to one fringe in 1.25 inches. If lens 33 collimates the light from source 25 to 15 minutes, rays 36 will be collimated to 1.5 seconds, and even if the degree of collimation of lens 33 be only 30 minutes, rays 36 will be collimated to approximately 9 seconds. It follows that the degree of accuracy of lens 33 is relatively immaterial, and that a relatively small and imperfect, and hence inexpensive, lens may be used. In fact, as already mentioned, the lens 33 can be dispensed with if desired. While enhanced collimation may be obtained in the manner described, it is to be pointed out that the invention is in no way limited to the collimating means illustrated, but is susceptible to use with other and varied collimating expedients.

As heretofore mentioned, the auxiliary optical system functions to place images of the reticle in the field of view of the instrument. In the embodiment of the invention shown in the drawings, the reticle mark will comprise the image of slit 32 carried by rays 36. It is to be understood, however, that the term "reticle" as it is used herein is to be construed as having the meaning commonly accorded thereto in the range finder art, and is to be considered as including any means associated with the instrument for producing visible indicia, such for example as a line, a dot, or a circle or other figure.

The light dividing means, previously noted, consists of a prism 40 having two reflecting faces 42 located in the path of rays 36. Faces 42 are preferably provided with silvered or other reflecting surfaces 42, which separate the reticle-carrying beam into two components, as indicated by ray lines 44, and reflect said rays towards mirrors 11. It will of course be apparent that instead of prism 40 there may be employed a pair of mirrors positioned in the same manner as prism surfaces 42, but the use of a single element is to be preferred by reason of the permanence and rigidity afforded thereby.

Mirrors 11, as previously described, are preferably transparent. Each mirror 11 has a reflecting element or prism 45 which is associated therewith and which is provided with a full silvered or other reflecting surface 46. Preferably each prism 45 is supported from the back surface of its respective mirror 11 as by securing it thereto with a suitable cement. This construction is desirable in providing the self-aligning feature of the instrument, although it is to be understood that the invention may be practiced by using a separate mount for each prism 45 and supporting the mount within the housing of the range finder in any conventional manner.

Each prism 45 is positioned with respect to its associated mirror 11 so that the reticle rays 44 proceeding towards such mirror, after passage therethrough, will be intercepted by the prisms 45 and reflected back through that mirror to be combined with rays 14 after the latter have been reflected by the mirror. The combined rays 14 from the field and the reticle rays are indicated by the ray lines 48. Thus, as an observer looks through the instrument, each of his eyes will see an image of slit 32 superimposed upon the field. The observer will fuse the two images of the slit 32 to form a stereoscopic image of the reticle, which will appear to be at some point in space in front of the instrument.

The range of the apparent position of the reticle image will depend on the angle between the right- and left-eye rays 48 as they leave the mirrors 15 or the rhombs 20 to enter the eyes of an observer. This angle between the emerging rays 48 is determined by the angle of incidence of rays 44 on the prism surfaces 46. Variation of this just-mentioned angle of incidence will cause variation of the angle between the rays 48 as they emerge from the instrument with the result that apparent motion of the reticle image will be caused. Some of the light, as represented by the rays 44 and 48, will be lost by reflection from the mirrors 11 each time this light passes therethrough. However, this light loss is substantially immaterial to the operation of the device and may be disregarded by the use of a source 25 of suitable intensity.

Means are provided for varying the angle of incidence of rays 44 on prism surfaces 46 and for thereby causing apparent motion in space of the stereoscopic reticle image. Said means comprise a pair of wedges 50 of glass or a suitable transparent material positioned so that each intercepts a set of the rays 44 which have been divided by prism 40 from the group of rays transmitted by prism 35. Wedges 50 are preferably circular, as shown in Fig. 6, and are secured in any suitable manner to shaft 52 for rotation therewith. Means are also provided for effecting the rotation of wedges 50 comprising, for example, gear teeth 54 on the rim of one of said wedges adapted to engage a gear 55 secured to one end of a shaft 56 which is rotatably mounted within the housing 10. At its other end, shaft 56 carries a gear 58 meshing with a worm gear 60 suitably mounted within the housing 10 and rotated from outside of the housing by a knurled knob 62. Knob 62 may be conveniently arranged as shown in Fig. 3 within a yoke 64 which supports a handle 65. A handle 66 at the other side of housing 10 is also provided.

The construction just described is advantageous in avoiding backlash which could cause different adjustment of the wedges 50. This is due to the fact that both wedges 50 are fixed to the same shaft and rotation of the shaft will cause simultaneous and similar movement of the wedges.

It will now be seen that as wedges 50 rotate with shaft 52, they will cause varying degrees of refraction of rays 44 and thus change the angle of incidence of said rays on prism surfaces 46. This will in turn change the angular relation between right- and left-eye rays 48 as they leave mirrors 15 and rhombs 20, and so cause the stereoscopic reticle image to appear to move along the line of sight.

The stereoscopic reticle image will appear to lie at its greatest distance from the instrument when left and right rays 48 are parallel to each other as they emerge from oculars 16 to enter the eyes of an observer, while this stereoscopic image will appear to move towards the instrument if these rays on emergence are diverging in a direction towards the observer's eyes.

The relation between the apparent position of the reticle image and the field depends largely upon the angular relation of mirrors 11 and 15 and upon the base line of the instrument, i. e., the distance between mirrors 11. If mirrors 15 are at right angles to each other and parallel to their associated mirrors 11, the reticle mark will appear to lie substantially at infinity with respect to the field when right and left eye rays 48 are parallel as they enter the eyes of the observer. If, however, mirrors 15 are at right angles to each other and mirrors 11 are at an angle of less than 90° to each other, or vice versa, the reticle image will appear to lie nearer in space than infinity when it is at its greatest apparent distance from the instrument, and will appear to move still nearer in the field as right and left eye rays 48 are caused to diverge as they travel towards the eyes of the observer.

There are also provided means for measuring the range of the apparent position of the stereoscopic image. Such means comprise a scale 68 of light-transmitting material mounted on one of wedges 50 and illuminated in any suitable way, as by means of a small electric bulb 70. A relatively small collimating lens 72 serves to put the image of scale 68 at infinity, and a small plate 74 of any suitable transparent material provides simple means for positioning a hairline in close proximity to scale 68. As has already been mentioned, left-eye mirror 15 is partially transparent, and the left eye of the observe may, therefore, view scale 68 as well as the field, the path of the rays from the bulb 70 being indicated by the dotted line 75 in Fig. 2. To be noted is the fact that scale 68 is carried by the rim of one of the wedges 50. Thus, rotation of the wedges and the scale 68 will be effected simultaneously. Backlash between the driving means for rotating the wedges and the driven gear 54 may be disregarded, since in any event both wedges will be rotated simultaneously.

Right-eye mirror 15 is preferably so constructed as to reflect the same amount of light as left-eye mirror 15 in order that the two images of the field may be seen under the same lighting conditions. For example, right-eye mirror 15 may also be partially transparent, but the back thereof may be ground or otherwise treated to prevent double-imaging.

It is believed that the operation of the range finder will be understood in view of the foregoing. The range finder is of a portable character and is suitable for viewing moving objects. For operation, it may be supported manually by grasping the handles 65 and 66 and raising the instrument to the level of the eyes, or it may be mounted on any conventional support device which rests on or extends in the ground or other supporting surface. The observer positions the instrument with its base line facing an object, the range of which is to be determined, and with the mirrors 11 in a position to image the object. With the range finder so positioned, the field of view will contain stereoscopic images of both the object and the reticle. The reticle will in all probability appear to be in a different plane from said object, either in front of or behind it in space. The observer then turns knob 62 until the stereoscopic image of the reticle appears to lie in the same plane as the object, and reads the range directly from scale 68.

It has already been mentioned that windows 12 in the front of the range finder are preferably wedge shaped and are rotatably mounted. This is to permit compensation for inaccuracies in the construction and initial positioning of optical elements used in the system by adjustment of the windows. For example, any initial departure in the angle between a prism surface 46 and its associated mirror 11 from the proper angular relation necessary for accurate reading may be compensated by rotation of the wedge type of window 12 in front of such mirror to bring the window to a position suitable to correct this undesired condition. Similarly, inaccuracies in the flatness or parallelism of the surfaces of mirrors 11 or the departure of the surfaces 42 of prism 40 from a desired perpendicular relation to each other may likewise be overcome by adjustment of one or both windows 12. Each window 12 is locked in its adjusted position by the clamping action of rims 76 and bolts 78, loosening of bolts 78 permitting a window to be rotated so as to carry out the necessary calibration of the instrument.

Other details of the construction of the above-described embodiment of the invention will be clearly apparent from the drawings, and it will be seen that all combine to lend rigidity to the instrument as well as to facilitate repair or adjustment. Mirrors 11 are each firmly secured to a plate 80 suitably apertured at 82 to permit passage of light to and from prism surface 46 and rigidly mounted in the housing by means of cover plates 84 and bolts 85. The central optical system may conveniently be mounted on a supporting plate 86, provided with side walls 88 which serve as both reinforcing and supporting elements and are apertured at 90 to permit passage of rays 30, 44 and 46. Back plate 92 may likewise be secured to plate 86 and walls 88 to form a unit, thus facilitating assembly and maintenance of the instrument. Ready access to the front of this portion of the instrument may be similarly provided by means of removable cover 94.

In view of the fact that the reticle image of the invention is provided by artificial light source 25, it is advantageous to provide also means for varying the degree of brightness of the image in order to compensate for different degrees of atmospheric conditions in use. It is preferable, therefore, to couple with light source 25 any suitable rheostat means, not shown, and to provide in combination therewith a suitable control knob 95 which may be manipulated from without housing 10.

One of the advantages to be derived from the construction described resides in the support of each reflecting element 45 on its respective mirror 11. This expedient makes the instrument self-aligning, at least about an axis which is vertical to the plane of Figs. 1 or 2. Displacement of either mirror 11 about such an axis due to jars, shocks or impacts to which the range finder may be subjected as well as to any bending moments imparted to the housing 11 of the instrument will cause simultaneous and related displacement of its respective element 45. Because of this related displacement, no repositioning of a mirror 11 displaced about the just-described axis is necessary to the functioning of the range finder so long as the element 45 displaced with the mirror directs a sufficient portion of the reticle rays to the ocular means to permit the reticle image to be observed.

Similarly, the instrument is self-aligning in the event of the displacement of the light-dividing means 40 about an axis vertical to the plane of Figs. 1 or 2, it being here noted that faces 42 of prism 40 are by design substantially at a right angle to each other and that displacement as described will shift the direction of each set of reflected rays so that they follow paths parallel to those shown in the drawings for the rays 44.

While support of elements 45 on mirrors 11 is preferred, such construction may, as already pointed out, be varied and each element 45 may be carried in a mount which is separate from that for its respective mirror.

A further feature of the invention is the use of simple optical elements having relatively few working surfaces. The use of such optical means obviously provides for ease of manufacture. Furthermore, the employment of optical wedges for the windows of the range finder also simplifies production of the instrument in that it becomes unnecessary to finish many of the optical elements with fine precision. The only curved surface elements employed are the lenses 33 and 72. These, as heretofore noted, may be omitted, but are used primarily for convenience and can be small and relatively inaccurate lenses without appreciably affecting the operation of the instrument. Furthermore, if monochromatic light is used to illuminate the reticle 32, prism 35 may be dispensed with.

Other advantages derive from this feature of simplicity. For example, the elimination of complex optical elements makes possible substantial reduction in the weight of the frame and housing of the instrument, which in turn makes the device adaptable to portable use and for employment in viewing moving targets.

A further important feature of the invention is its adaptability to use at unit magnification without the employment of lenses. This presents the advantage of the elimination of the need for a special finder for the field of view and speeds ranging operations. However, if desired, telescope systems may be employed for viewing the left-eye and right-eye images. In such event, the objective of the system for each eye can be located anywhere in the light path after the rays from the object and from the reticle are joined. The mounting of a pair of binoculars with their objectives aligned with the oculars 16 of the range finder is contemplated by this concept as a simple means of supplying magnification where the same is desired.

Various modifications may be made in the range finder. As already mentioned, any collimating system other than that disclosed in the drawings is included within the scope of the invention. As a further example, instead of transparent mirrors 11, mirrors having an opaque back may be used. In this latter instance, prisms 46 will preferably be reduced in size and mounted on the faces of mirrors 11, with ray-deflecting surfaces 46 of the prisms in the same relative positions in the illustrated embodiment of the invention.

Since certain changes in the constructions set forth which embody the invention may be made without departing from its scope, it is intended that all matter contained in the above description, or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a stereoscopic range finder, spaced left and right reflecting means inclined to the base of the range finder for receiving respectively left and right rays proceeding from an object undergoing observation, each reflecting means comprising a transparent body having a reflecting surface positioned to view the object and reflect light rays received from the object towards the center of said base line, means for deflecting each set of redirected object rays, ocular means in the path of the deflected rays whereby to view the field, an illuminated reticle, and means for superimposing left-eye and right-eye images of the reticle on the field of view comprising means for directing light rays which proceed from the reticle towards each of said reflecting surfaces, and auxiliary reflecting means associated with each transparent reflecting means in a position adjacent a face of the transparent reflecting means which is more distant from the center of said base line than the reflecting surface of the transparent reflecting means, said directed reticle rays passing through each transparent reflecting means and being intercepted and redirected by said auxiliary reflecting means to return through the transparent reflecting means along the path traveled by the rays from the object which are reflected by the transparent reflecting means.

2. In a stereoscopic range finder, spaced left and right reflecting means inclined to the base of the range finder for receiving respectively left and right rays proceeding from an object undergoing observation, each reflecting means comprising a transparent body having a reflecting surface positioned to view the object and reflect light rays received from the object towards the center of said base line, means for deflecting each set of redirected object rays, ocular means in the path of the deflected rays whereby to view the field, an illuminated reticle, and means for superimposing left and right-eye images of the reticle on the field of view comprising means for directing light rays which proceed from the reticle towards each of said reflecting surfaces, and an auxiliary reflecting element fixed to and extending from a face of each transparent reflecting means which is more distant from the center of said base line than said reflecting surface of the transparent reflecting means, the light rays proceeding from the reticle being directed through the reflecting surface of each transparent reflecting means and through the transparent reflecting means itself and each reflecting element being positioned with respect to its respective transparent reflecting means to intercept and reflect the rays passed through the transparent reflecting means and to return said last-named rays through the transparent reflecting means and along the path traveled by the rays from the object which have been reflected by the transparent means.

3. In a stereoscopic range finder, a pair of transparent plates each having a front surface and a back surface which are substantially plane and parallel, said plates being spaced apart and oppositely inclined to the base line of the range finder in a position wherein their respective front surfaces receive respectively left and right rays from an object being observed and reflect rays received from the left and right of the object towards each other, means for deflecting each set of redirected object rays, ocular means in the path of the deflected rays whereby to view the field, an illuminated reticle, and means for superimposing left-eye and right-eye images of the reticle on the field of view comprising means for directing rays from the reticle towards and through each plate, and a reflecting element fixedly secured to and extending from each back surface of each plate, each reflecting element having a reflecting face located in the path of rays directed from the reticle and positioned to reflect said last-named rays through its respective plate and combine them with rays from the object which have been reflected by said plate.

4. In a stereoscopic range finder, a pair of transparent plates each having a front surface and a back surface which are substantially plane and parallel, said plates being spaced apart and oppositely inclined to the base line of the range finder in a position wherein their respective front surfaces receive respectively left and right rays from an object being observed and reflect rays received from the left and right of the object towards each other, means for deflecting each set of redirected object rays, ocular means in the path of the deflected rays whereby to view the field, an illuminated reticle, means for superimposing left and right-eye images of the reticle on the field of view comprising means for directing rays from the reticle towards and through each plate, and a reflecting element fixedly secured to and extending from each back surface of each plate, each reflecting element having a reflecting face located in the path of rays directed from the reticle and positioned to reflect said last-named rays through its respective plate and combine them with rays from the object which have been reflected by said plate, and adjustable optical wedge means positioned in each path of rays proceeding from the reticle towards each reflecting means for varying the angle of incidence of said last-named rays on each additional reflecting means whereby to make the images of the reticle and of the object appear in substantially the same plane.

5. In a range finder having means for forming spaced left-eye and right-eye images of an object undergoing observation, ocular means for viewing said images, an illuminated reticle, and means for superimposing spaced left-eye and right-eye images of the reticle in the field of view, the combination comprising prism means for collimating rays proceeding from said reticle, said prisim means having an entrance face and an exit face and being positioned with respect to the reticle to receive rays proceeding from the reticle at substantially grazing incidence on the entrance face and to redirect such rays through the prism means and said exit face, and second prism means through which light is passed for achromatizing and redirecting such light, said second prism means having an entrance face aligned with the exit face of the first prism means, a reflecting face and an exit face, said reflecting face receiving the entering rays and redirecting them through the exit face of the second prism means in substantially perpendicular relation thereto, both prism means being located in the path of the rays from the reticle before they are directed into the field of view.

6. In a range finder having means for forming spaced left-eye and right-eye images of an object undergoing observation, ocular means for viewing said images, an illuminated reticle, and means for superimposing spaced left-eye and right-eye images of the reticle in the field of view, the combination comprising lens means positioned adjacent the reticle for receiving and collimating rays proceeding from the reticle, prism means for further collimating said rays, said prism means having an entrance and an exit face positioned to have rays collimated by the lens means directed thereon at substantially grazing incidence, the collimated rays entering said prism means to pass therethrough and emerge from said exit face in further collimated condition, and second prism means through which light is passed for achromatizing and redirecting such light, said second prism means having an entrance face aligned with the exit face of the first prism means, and said lens means and both of said prism means being located in the path of the rays from the reticle before such rays are directed into the field of view.

7. In a range finder having spaced reflecting means forming left and right-eye images of an object, ocular means and means for directing light reflected by said spaced reflecting means into said ocular means whereby to view the object, the combination of an auxiliary optical system for impressing spaced left-eye and right-eye images of a reticle on the field of view, said system comprising a light source, a reticle illuminated by the light source, prism means for collimating light rays proceeding from said reticle, said prism means having an entrance face positioned to receive rays from the reticle at a substantially grazing angle of incidence and an exit face through which light entering the prism emerges, light-dividing means positioned to intercept light transmitted by said prism means for dividing said emerging light and directing rays therein in opposite directions and towards each of said spaced reflecting means, and auxiliary reflecting means positioned with respect to each spaced reflecting means for receiving rays directed towards said spaced reflecting means by said light-dividing means and redirecting and combining said last-named rays with the light from the object reflected by the spaced reflecting means with which each auxiliary reflecting means is associated.

8. In a range finder having spaced reflecting means forming left-eye and right-eye images of an object, ocular means and means for directing light reflected by said spaced reflecting means into said ocular means whereby to view the object, the combination of an auxiliary optical system for impressing spaced left-eye and right-eye images of a reticle on the field of view, said system comprising a light source, a reticle illuminated by the light source, prism means for collimating light rays proceeding from said reticle, said prism means having an entrance face positioned to receive rays from the reticle at a substantially grazing angle of incidence and an exit face through which light entering the prism emerges, second prism means for achromatizing and redirecting light passing therethrough, said second prism means having an entrance face aligned with the exit face of the first prism means, light-dividing means positioned to intercept light transmitted by said prism means for dividing said transmitted light and directing rays thereof in opposite directions and towards each of said spaced reflecting means, auxiliary reflecting means positioned with respect to each spaced reflecting means for receiving rays directed towards said spaced reflecting means by said light-dividing means and redirecting and combining each of said last-named rays with the light from the object reflected by the spaced reflecting means with which each auxiliary reflecting means is associated, and optical wedge means positioned in the path of each set of divided rays proceeding from the light-dividing means for adjusting the angle of incidence which each set of divided rays makes with its auxiliary reflecting means.

9. In a range finder having spaced reflecting means forming left-eye and right-eye images of an object, ocular means and means for directing light reflected by said spaced reflecting means into said ocular means whereby to view the object, the combination of an auxiliary optical system for impressing spaced left-eye and right-eye images of a reticle on the field of view, said system comprising a light source, a reticle illuminated by the light source, prism means for collimating light rays proceeding from said reticle, said prism means having an entrance face positioned to receive rays from the reticle at a substantially grazing angle of incidence and an exit face through which light entering the prism emerges, second prism means for achromatizing and redirecting light passing therethrough, said second prism means having an entrance face aligned with the exit face of the first prism means, light dividing means positioned to intercept light transmitted by said prism means for dividing said transmitted light and directing rays thereof in opposite directions and towards each of said spaced reflecting means, and auxiliary reflecting means mounted on and secured to each first-named reflecting means in a position to intercept rays directed towards each first-named reflecting means by said light-dividing means and for redirecting and combining each set of said last-named rays with light from the object reflected by the first-named reflecting means with which each auxiliary reflecting means is associated.

10. Means in a range finder for imaging in the field of view both an object undergoing observation and an illuminated reticle which is angularly positioned with respect to the object, comprising transparent reflecting means having its surface nearest said reticle positioned to intercept and reflect light rays proceeding from the object and to have light rays proceeding from the reticle transmitted therethrough and through the transparent reflecting means itself, and a reflecting element secured to a second surface of said transparent reflecting means, said element having a reflecting surface positioned to intercept the rays from the reticle transmitted through the transparent reflecting means and to reflect said last-named rays in the direction of the rays from the object which have been reflected from the transparent reflecting means whereby to combine the two sets of reflected rays.

11. Means in a range finder for imaging in the field of view both an object undergoing observation and an illuminated reticle which is angularly positioned with respect to the object, comprising a transparent plate having two substantially plane parallel surfaces and its front surface facing said reticle and in a position to intercept and reflect light rays received from the object and to have light rays proceeding from the reticle transmitted therethrough and through the plate itself, and a reflecting element secured to and extending from the back surface of said plate, said element having a reflecting surface positioned to intercept the rays from the reticle transmitted through the plate and to reflect said last-named rays in the direction of the rays from the object which have been reflected by the plate whereby to combine the two sets of reflected rays.

12. In a range finder having means for forming spaced left-eye and right-eye images of an object undergoing observation, ocular means for viewing said images, an illuminated reticle, and means for superimposing spaced left-eye and right-eye images of the reticle in the field of view, in combination, prism means through which light proceeding from the reticle passes while undergoing refraction whereby to collimate said light and decrease the apparent separation between the rays thereof which emanate from different points lying in the plane of collimation, said prism means having an entrance face and an exit face which are angularly disposed with respect to each other, the prism means being located in the path of rays from the reticle before they are directed into the field of view in a position to have the entrance face thereof intercept rays from the reticle at substantially an angle of grazing incidence.

13. In a range finder having means for forming spaced left-eye and right-eye images of an object undergoing observation, ocular means for viewing said images, an illuminated reticle and means for superimposing spaced left-eye and right-eye images of the reticle in the field of view, in combination, means for collimating light comprising a lens which intercepts rays proceeding from said reticle and transmits the intercepted rays in a collimated condition, and means for improving the collimation of said rays transmitted by said lens and for decreasing the apparent angular separation between the rays which emanate from different points in the plane of collimation, said last named means comprising a prism disposed in the path of rays transmitted by said lens in a position to receive, refract and transmit rays which are passed by said lens, said prism having an entrance face which intercepts rays proceeding from said lens at substantially a grazing angle of incidence and an exit face angularly disposed to the entrance face and through which light incident on the entrance face at substantially the grazing angle is transmitted.

EDWIN H. LAND.

---

Certificate of Correction

Patent No. 2,397,275.   March 26, 1946.

EDWIN H. LAND

It is hereby certified that errors appear in the printed specification of the above numbered patent requiring correction as follows: Page 4, second column, line 12, for "housing 11" read *housing 10*; page 5, first column, line 9, for "ray-deflecting" read *ray-reflecting*; page 6, first column, line 2, claim 5, for "prisim" read *prism*; line 61, claim 7, for "therein" read *thereof*; and that the said Letters Patent should be read with these corrections therein that the same may conform to the record of the case in the Patent Office.

Signed and sealed this 8th day of July, A. D. 1947.

[SEAL]

LESLIE FRAZER,
*First Assistant Commissioner of Patents.* element secured to a second surface of said transparent reflecting means, said element having a reflecting surface positioned to intercept the rays from the reticle transmitted through the transparent reflecting means and to reflect said last-named rays in the direction of the rays from the object which have been reflected from the transparent reflecting means whereby to combine the two sets of reflected rays.

11. Means in a range finder for imaging in the field of view both an object undergoing observation and an illuminated reticle which is angularly positioned with respect to the object, comprising a transparent plate having two substantially plane parallel surfaces and its front surface facing said reticle and in a position to intercept and reflect light rays received from the object and to have light rays proceeding from the reticle transmitted therethrough and through the plate itself, and a reflecting element secured to and extending from the back surface of said plate, said element having a reflecting surface positioned to intercept the rays from the reticle transmitted through the plate and to reflect said last-named rays in the direction of the rays from the object which have been reflected by the plate whereby to combine the two sets of reflected rays.

12. In a range finder having means for forming spaced left-eye and right-eye images of an object undergoing observation, ocular means for viewing said images, an illuminated reticle, and means for superimposing spaced left-eye and right-eye images of the reticle in the field of view, in combination, prism means through which light proceeding from the reticle passes while undergoing refraction whereby to collimate said light and decrease the apparent separation between the rays thereof which emanate from different points lying in the plane of collimation, said prism means having an entrance face and an exit face which are angularly disposed with respect to each other, the prism means being located in the path of rays from the reticle before they are directed into the field of view in a position to have the entrance face thereof intercept rays from the reticle at substantially an angle of grazing incidence.

13. In a range finder having means for forming spaced left-eye and right-eye images of an object undergoing observation, ocular means for viewing said images, an illuminated reticle and means for superimposing spaced left-eye and right-eye images of the reticle in the field of view, in combination, means for collimating light comprising a lens which intercepts rays proceeding from said reticle and transmits the intercepted rays in a collimated condition, and means for improving the collimation of said rays transmitted by said lens and for decreasing the apparent angular separation between the rays which emanate from different points in the plane of collimation, said last named means comprising a prism disposed in the path of rays transmitted by said lens in a position to receive, refract and transmit rays which are passed by said lens, said prism having an entrance face which intercepts rays proceeding from said lens at substantially a grazing angle of incidence and an exit face angularly disposed to the entrance face and through which light incident on the entrance face at substantially the grazing angle is transmitted.

EDWIN H. LAND.

Certificate of Correction

Patent No. 2,397,275.   March 26, 1946.

EDWIN H. LAND

It is hereby certified that errors appear in the printed specification of the above numbered patent requiring correction as follows: Page 4, second column, line 12, for "housing 11" read *housing 10*; page 5, first column, line 9, for "ray-deflecting" read *ray-reflecting*; page 6, first column, line 2, claim 5, for "prisim" read *prism*; line 61, claim 7, for "therein" read *thereof*; and that the said Letters Patent should be read with these corrections therein that the same may conform to the record of the case in the Patent Office.

Signed and sealed this 8th day of July, A. D. 1947.

[SEAL]

LESLIE FRAZER,
*First Assistant Commissioner of Patents.*